(12) United States Patent
Ishikawa

(10) Patent No.: US 11,480,330 B2
(45) Date of Patent: Oct. 25, 2022

(54) DRIVING TOOL

(71) Applicant: MAKITA CORPORATION, Anjo (JP)

(72) Inventor: Naoharu Ishikawa, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 17/236,644

(22) Filed: Apr. 21, 2021

(65) Prior Publication Data

US 2021/0404647 A1 Dec. 30, 2021

(30) Foreign Application Priority Data

Jun. 29, 2020 (JP) .............................. JP2020-111293

(51) Int. Cl.
*B25C 7/00* (2006.01)
*B25C 1/06* (2006.01)
*B25C 1/00* (2006.01)
*F21V 33/00* (2006.01)
*F21V 8/00* (2006.01)

(52) U.S. Cl.
CPC ............ *F21V 33/0084* (2013.01); *B25C 1/06* (2013.01); *B25C 7/00* (2013.01); *G02B 6/0008* (2013.01); *B25C 1/008* (2013.01)

(58) Field of Classification Search
CPC ......... F21V 33/0084; B25C 1/06; B25C 7/00; B25C 1/008; G02B 6/0008
See application file for complete search history.

(56) References Cited

U.S. PATENT DOCUMENTS

| 5,285,708 | A * | 2/1994 | Bosten ................. | B23D 33/12 362/89 |
| 5,996,460 | A * | 12/1999 | Waite ................. | B23D 59/003 83/477.1 |
| 6,286,745 | B1 * | 9/2001 | Ackeret ............... | B26B 11/008 227/76 |
| 6,644,825 | B2 * | 11/2003 | Lin ....................... | B25F 5/021 362/120 |
| 7,200,516 | B1 * | 4/2007 | Cowley ................. | B23B 49/00 356/138 |
| 8,359,960 | B2 * | 1/2013 | Ushiwata .............. | B26D 7/01 83/520 |
| 9,114,494 | B1 * | 8/2015 | Mah ...................... | B25H 1/0092 |
| 9,328,915 | B2 * | 5/2016 | Vanko .................... | B25B 23/18 |
| 10,286,534 | B2 * | 5/2019 | Kato ........................ | B25C 1/04 |
| 2004/0216314 | A1 * | 11/2004 | Ch Fung .............. | B25H 1/0085 33/334 |
| 2007/0039992 | A1 * | 2/2007 | Shen ........................ | B25C 7/00 227/120 |

(Continued)

FOREIGN PATENT DOCUMENTS

JP 2009-202287 A 9/2009
JP 2012166309 A 9/2012

*Primary Examiner* — Thomas M Wittenschlaeger
*Assistant Examiner* — Katie L Gerth
(74) *Attorney, Agent, or Firm* — Oliff PLC

(57) ABSTRACT

A driving tool allows easy assembly and effective illumination of an area around a nozzle. A driving tool includes a striking mechanism that strikes a fastener, a body including the striking mechanism and an illuminator, a nozzle to allow ejection of the fastener struck by the striking mechanism, and a light guide between the illuminator and the nozzle.

17 Claims, 11 Drawing Sheets

(56) References Cited

U.S. PATENT DOCUMENTS

| | | | | |
|---|---|---|---|---|
| 2008/0025017 A1* | 1/2008 | Tadokoro | ............... | B25F 5/021 |
| | | | | 362/119 |
| 2008/0185410 A1* | 8/2008 | Oomori | .................. | B25F 5/029 |
| | | | | 224/269 |
| 2010/0116863 A1* | 5/2010 | Suda | ........................ | B25C 1/06 |
| | | | | 227/8 |
| 2011/0297722 A1* | 12/2011 | Pritchett, Jr. | ......... | B25C 5/1693 |
| | | | | 227/12 |
| 2012/0205420 A1* | 8/2012 | Miyata | ..................... | B25C 1/08 |
| | | | | 227/10 |
| 2014/0000921 A1* | 1/2014 | Vanko | ................... | B23Q 17/22 |
| | | | | 173/11 |
| 2014/0088753 A1* | 3/2014 | Lim | ....................... | B25F 5/021 |
| | | | | 700/168 |
| 2015/0314432 A1* | 11/2015 | Yang | ........................ | B25C 1/06 |
| | | | | 227/8 |
| 2018/0099400 A1* | 4/2018 | Wong | ....................... | B25C 1/00 |
| 2019/0126451 A1* | 5/2019 | Nagurka | ............. | G01N 21/255 |
| 2019/0143498 A1* | 5/2019 | Weber | .................... | B25C 1/042 |
| | | | | 227/140 |
| 2020/0039046 A1* | 2/2020 | Taki | ........................ | B25C 1/005 |
| 2020/0156230 A1* | 5/2020 | Ferris | ........................ | B25C 1/06 |

\* cited by examiner

DRIVING TOOL

CROSS-REFERENCE TO RELATED APPLICATIONS

This application claims the benefit of priority to Japanese Patent Application No. 2020-111293, filed on Jun. 29, 2020, the entire contents of which are hereby incorporated by reference.

BACKGROUND

1. Technical Field

The present disclosure relates to a driving tool for driving a fastener such as a nail or a staple into wood or other material.

2. Description of the Background

The driving tool includes a striking mechanism for ejecting a fastener. The fastener is fed onto a driving path in front of the striking mechanism in the driving direction. A magazine loaded with multiple fasteners is connected along the driving path. One fastener at a time is automatically fed from the magazine onto the driving path as the striking mechanism is driven. The fastener is ejected by the striking mechanism through a nozzle at the front of the driving path in the driving direction. The fastener is thus driven into wood or other material.

To provide good visibility of a driving target place for the fastener, a known driving tool includes an illuminator for illuminating the nozzle and its surrounding area. A driving tool described in Japanese Unexamined Patent Application Publication No. 2009-202287 includes an illuminator at the front of a magazine in the driving direction. The driving tool includes a body that receives a battery as a power supply. The battery and the illuminator are electrically connected to each other with a wire routed inside the body and along a side portion of the magazine. The wire along the side portion of the magazine is to be covered for protection against any break. This complicates the magazine structure and increases the man-hours for assembly. The magazine has a door that is operable to open and close a box-shaped magazine body. The wire is routed to avoid the door and its surrounding area. The wire routing along the side portion of the magazine body is usually difficult.

Japanese Unexamined Patent Application Publication No. 2012-166309 describes a driving tool including an illuminator on a front side portion of a body located rearward from a magazine in the driving direction. The illuminator illuminates a nozzle and its surrounding area from a position rearward from the magazine in the driving direction. The illuminator is powered by a battery attached to a side portion of the body opposite to the illuminator.

BRIEF SUMMARY

When the nozzle is illuminated from a position rearward from the magazine in the driving direction, an area around the nozzle may often be shadowed by the magazine. The area around the nozzle cannot be illuminated easily. For an illuminator located to be less likely to shadow an area around a nozzle, routing a wire from a power supply to the illuminator is complicated. This also complicates the assembly. A driving tool may allow easy assembly and effective illumination in an area around a nozzle.

An aspect of the present disclosure provides a driving tool, including:
a striking mechanism configured to strike a fastener;
a body including the striking mechanism and an illuminator;
a nozzle to allow ejection of the fastener struck by the striking mechanism; and
a light guide between the illuminator and the nozzle.

This allows light from a light output portion to travel in the direction perpendicular to an inclined surface. The area around the nozzle is thus illuminated with concentrated light with high illumination efficiency.

DETAILED DESCRIPTION

Figure 1:
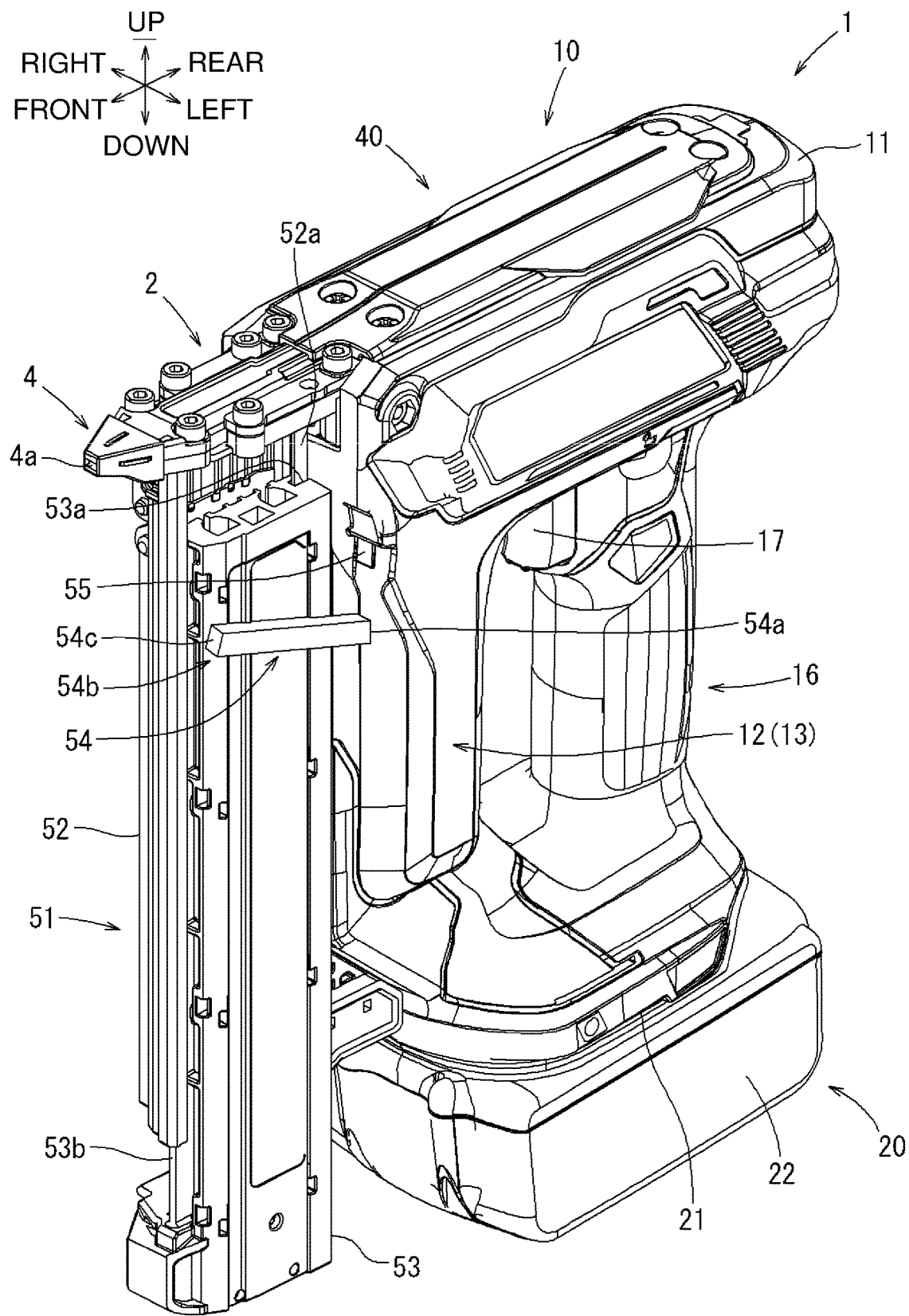
FIG. 1 is a perspective view of a driving tool according to a first embodiment.

A driving tool 1 according to a first embodiment of the present disclosure will now be described with reference to FIGS. 1 to 7. As shown in FIG. 1, the driving tool 1 according to the present embodiment is a rechargeable finish nailer including a mechanical spring. This nailer is also referred to as a pin nailer. The driving tool 1 includes a compression spring to apply an urging force as a striking force (driving force) for driving a fastener T into a workpiece W (refer to FIG. 5). The driving direction in which the fastener T is driven is herein defined as the front, and the direction opposite to the driving direction is defined as the rear. The right-left direction is defined as viewed from the user.

As shown in FIG. 1, the driving tool 1 includes a body 10 housed in a body housing 11. The body 10 has, at its front, a motor compartment 12 extending downward. The motor compartment 12 accommodates an electric motor 13 as a drive. The body 10 includes, at its rear, a grip 16 gripped by the user. The grip 16 extends downward. The motor compartment 12 and the grip 16 extend substantially parallel to each other. The body 10 includes a power supply portion 20 extending between the bottom of the motor compartment 12 and the bottom of the grip 16. The power supply portion 20 extends in the front-rear direction. The body housing 11, the motor compartment 12, the power supply portion 20, and the grip 16 form a loop.

Figure 5:
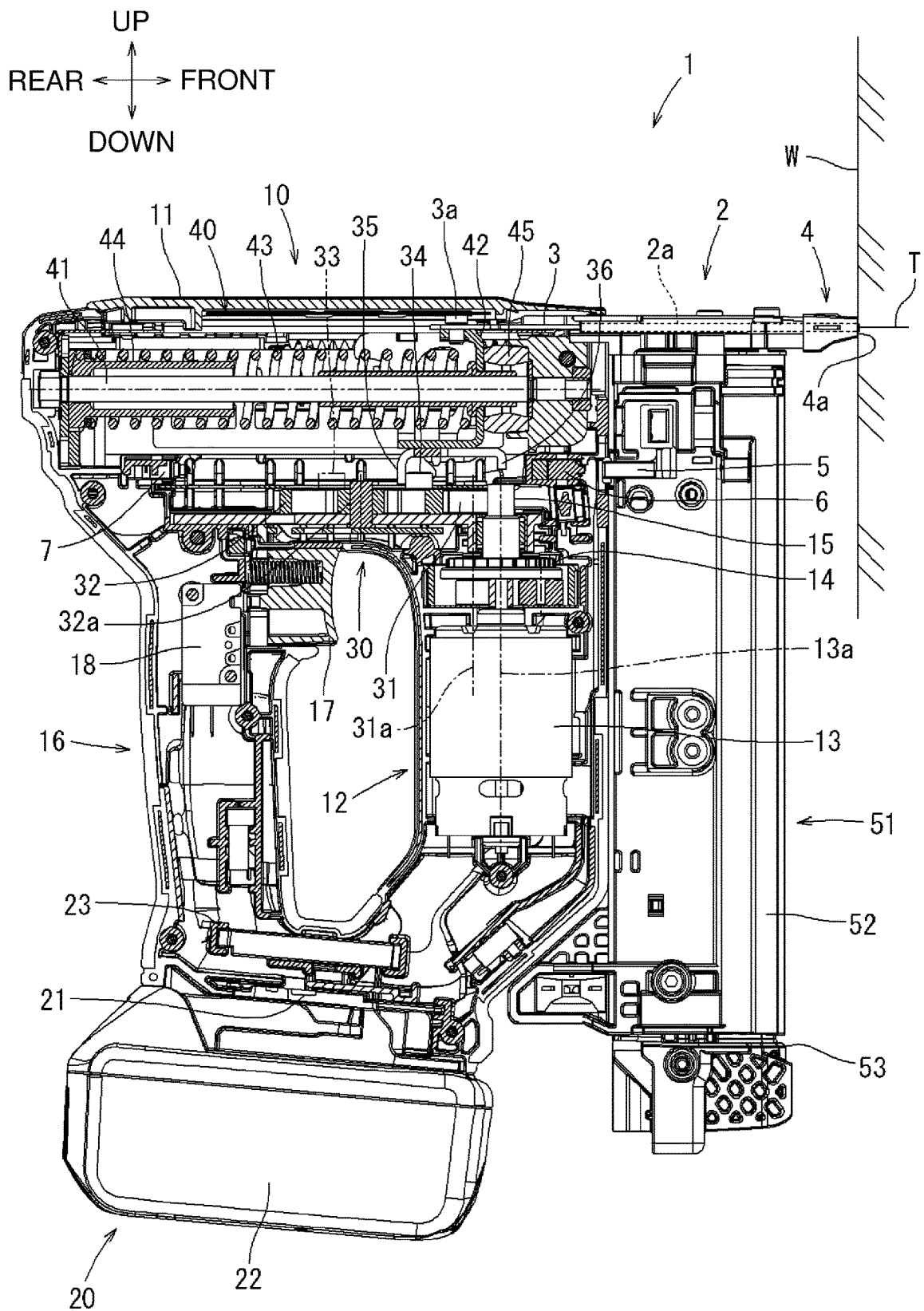
FIG. 5 is a longitudinal sectional view of the driving tool taken along line V-V in FIG. 4 as viewed in the direction indicated by arrows.

As shown in FIG. 5, the body 10 includes a driving nose 2 at the front. The driving nose 2 guides a striking driver 3 in the driving direction. The driving nose 2 defines a driving path 2a extending in the front-rear direction. The driving nose 2 includes a nozzle 4 at the front end. The nozzle 4 has a port 4a at the front end. The port 4a communicates with the driving path 2a. The striking driver 3 advances in the driving path 2a to strike and eject the fastener T through the port 4a. A fastener T ejected through the port 4a is driven into the workpiece W.

The driving nose 2 shown in FIG. 5 is movable in the front-rear direction relative to the body housing 11 within a predetermined range. The driving operation can be performed when the driving nose 2 is retracted relative to the body 10 with the nozzle 4 pressed against the workpiece W. The driving nose 2 thus also serves as a contact arm operable to permit the driving operation. The driving nose 2 has a rear portion facing the front surface of the body housing 11 and coupled to an actuation arm 5. The actuation arm 5 is movable back and forth together with the driving nose 2.

The body housing 11 includes a microswitch 6 in the front portion behind the actuation arm 5. The microswitch 6 is pressed by the actuation arm 5 to turn on in response to the driving nose 2 being retracted relative to the body housing 11. The driving operation can be performed in response to the microswitch 6 for detecting actuation turning on. The body housing 11 includes, in its rear portion, a microswitch 7 (described later) for detecting the retraction end position of the striking driver 3.

As shown in FIGS. 1 and 5, the driving nose 2 is coupled to a magazine 51. The magazine 51 is a rectangular box extending with its long sides aligning with the vertical direction and also extending in the driving direction. The magazine 51 extends downward from the lower surface of the driving nose 2 along the front of the motor compartment 12. The magazine 51 is loaded with a plate-like fastener assembly including many fasteners T that are temporarily connected in parallel. The magazine 51 has a straight rectangular shape to accommodate the fastener assembly extending vertically in a flat plate. The magazine 51 feeds the loaded fastener assembly with pitches toward the driving nose 2 in cooperation with the driving operation in the body 10. One fastener T at a time is thus fed into the driving path 2a. The magazine 51 will be described in detail later.

As shown in FIG. 5, the grip 16 includes a trigger switch lever 17 on the front upper portion. The switch lever 17 is located inside the loop formed by the body housing 11, the motor compartment 12, the power supply portion 20, and the grip 16. The grip 16 accommodates a switch body 18 behind the switch lever 17. The user pulls the switch lever 17 with a fingertip of the hand holding the grip 16 with the driving nose 2 retracted to the on-position, or in other words, with the microswitch 6 being on. This causes the switch body 18 to turn on to activate the electric motor 13. The user stops pulling the switch lever 17 to turn off the switch body 18. The electric motor 13 automatically stops after the switch body 18 is turned off or after a driver base 42 (described later) returns to the retraction end (initial position) while the switch lever 17 remains pulled.

The power supply portion 20 includes a battery mount 21 on the lower surface. The battery mount 21 receives a battery pack 22. The battery pack 22 supplies power mainly to the electric motor 13. Although not seen in detail in the figures, the battery mount 21 includes a pair of right and left rails and positive and negative terminal plates. The rails mechanically receive the battery pack 22. The positive and negative terminal plates are electrically connected to the battery pack 22. The battery mount 21 accommodates a controller 23. The controller 23 incorporates a control circuit board for controlling the operation of the electric motor 13, and a power circuit board.

The battery pack 22 shown in FIG. 1 is a lithium-ion battery with an output of 18 V. The battery pack 22 is slidable for attachment and detachment. The battery pack 22 is slidable backward relative to the battery mount 21 for detachment. The battery pack 22 is slidable forward for attachment. The battery pack 22 detached from the battery mount 21 may be charged with a separately prepared charger to allow repeated use. The battery pack 22 can also be used for other power tools such as rechargeable screw tightening machines or cutting machines.

As shown in FIG. 5, the body 10 includes a driver returner 30 and a striking mechanism 40 in the body housing 11. The striking mechanism 40 includes the driver base 42 and a striking spring 43. The driver base 42 supports the striking driver 3. The striking spring 43 urges the driver base 42 in the driving direction (forward). The striking spring 43 is a compression spring having a relatively large wire diameter and a relatively large coil diameter. The striking driver 3 is an elongated plate that stays in the driving path 2a in a smoothly movable manner. The striking driver 3 has the rear portion coupled to the upper portion of the driver base 42 with an engagement pin 3a.

The body housing 11 includes a support shaft 41 that is a rod. The support shaft 41 extends substantially across the body housing 11 from the front to the rear. The striking spring 43 is wound around the support shaft 41. The driver base 42 is supported slidably back and forth relative to the body housing 11. The driver base 42 is supported with the support shaft 41 being restricted from rotating about its axis. The striking spring 43 is between the driver base 42 and the rear of the body housing 11 in the front-rear direction. The driver base 42 and the striking driver 3 are urged by the striking spring 43 in the driving direction. Under the urging force from the striking spring 43, a fastener T in the driving path 2a is struck by the striking driver 3 and ejected through the port 4a.

The body housing 11 includes a leading end damper 45 in the front portion. The leading end damper 45 is a hollow cylinder through which the support shaft 41 extends. The leading end damper 45 absorbs shocks from the driver base 42 moving in the driving direction at the leading end position. The body housing 11 includes a cylindrical holding sleeve 44 in the rear portion. The holding sleeve 44 is inside the striking spring 43 in the rear portion. The holding sleeve 44 may prevent the compressed striking spring 43 from being stuck by bending and deforming.

A first engagement receiver 35 and a second engagement receiver 36 are located on the lower surface of the driver base 42. The first engagement receiver 35 and the second engagement receiver 36 protrude downward. Although not seen in detail in the figures, the first engagement receiver 35 and the second engagement receiver 36 each extend laterally with a predetermined dimension. The first engagement receiver 35 is located rearward from the second engagement receiver 36 by a predetermined distance. The first engagement receiver 35 protrudes more downward than the second engagement receiver 36. The first engagement receiver 35 and the second engagement receiver 36 are movable back and forth together with the driver base 42.

The electric motor 13 is accommodated in the motor compartment 12 with a motor axis 13a extending vertically. A planetary gear train 14 and an output gear 15 align with each other along the motor axis 13a above the electric motor 13. The rotational output from the electric motor 13 is reduced by the planetary gear train 14 and is then output to the output gear 15.

The driver returner 30 includes a single return gear (drive gear) 32 and a single idler gear 31. The return gear 32 is supported rotatably about a vertically extending axis 32a in the lower portion of the body housing 11. The idler gear 31 is supported rotatably about a vertically extending axis 31a in the lower portion of the body housing 11. The axis 32a is located rearward from the axis 31a. The idler gear 31 meshes with both the output gear 15 and the return gear 32. The output gear 15 receives the rotational output from the electric motor 13. The idler gear 31, which is also called an intermediate gear, transmits the rotational output from the output gear 15 to the return gear 32 without any increase or decrease. Thus, the reduction ratio of the return gear 32 depends on the ratio of the number of teeth of the return gear 32 to that of the output gear 15. The return gear 32 rotates in the same direction as the output gear 15 with the idler gear 31 between them.

A first engagement portion 33 and a second engagement portion 34 are located on the upper surface of the return gear 32. The first engagement portion 33 and the second engagement portion 34 are cylindrical upward protrusions having substantially the same diameter. The first engagement portion 33 protrudes less upward than the second engagement portion 34 to about a half the height of the second engagement portion 34. In other words, the first engagement portion 33 protrudes to a height engageable with the first engagement receiver 35 and non-engageable with the second engagement receiver 36. The second engagement portion 34 protrudes to a height engageable with both the first engagement receiver 35 and the second engagement receiver 36. The first engagement portion 33 and the second engagement portion 34 are located at different positions in the rotation direction about the axis 32a. The interval between the first engagement portion 33 and the second engagement portion 34 in the rotation direction is determined as appropriate in accordance with the timing of engagement with the first engagement receiver 35 or the second engagement receiver 36.

The operation of the striking driver 3 with the striking mechanism 40 and the driver returner 30 will now be described. FIG. 5 shows the striking driver 3 at the leading end position under the urging force from the striking spring 43 immediately after driving the fastener T into the workpiece W. The electric motor 13 is activated in response to the microswitch 6 being turned on and the switch body 18 being turned on by pulling the switch lever 17. The microswitch 6 is turned on in response to the driving nose 2 as a contact arm being retracted while being pressed against the workpiece W. The microswitch 6 and the switch body 18 are turned on to start power supply to the electric motor 13. The driver returner 30 then starts operating.

In response to the electric motor 13 being activated, the return gear 32 starts to rotate. The first engagement portion 33 is then pressed against the front surface of the first engagement receiver 35. The driver base 42, which is integral with the first engagement receiver 35, then moves backward against the urging force from the striking spring 43. This causes the striking driver 3, which is integral with the driver base 42, to return to the retraction end position.

As the return gear 32 rotates further, the first engagement portion 33 moves away from the front surface of the first engagement receiver 35, whereas the second engagement portion 34 is pressed against the front surface of the second engagement receiver 36. Thus, the drive for the return operation with the rotating return gear 32 switches from the first engagement portion 33 to the second engagement portion 34. The second engagement receiver 36 and the driver base 42 continue retracting against the urging force from the striking spring 43.

In response to the driver base 42 reaching the retraction end position, the retracting first engagement receiver 35 presses and turns on the microswitch 7. After the microswitch 7 is turned on, the electric motor 13 is disconnected from the power supply and stops, thus causing the return gear 32 to stop. This causes the first engagement portion 33 and the second engagement portion 34 to stop moving. Thus, the driver base 42 and the striking driver 3 stop at the retraction end position (initial position).

With the driver base 42 and the striking driver 3 at the initial position, the microswitch 6 is turned on while the driving nose 2 is being pressed against the workpiece W, and the switch body 18 is turned on by pulling the switch lever 17. The electric motor 13 is then activated to rotate the return gear 32. This causes the second engagement portion 34 to move away from the second engagement receiver 36. This disconnects the motive power that returns the driver base 42 toward the retraction end position against the urging force from the striking spring 43. The driver base 42 thus advances under the urging force from the striking spring 43, causing the striking driver 3 to advance in the driving path 2a. The fastener T in the driving path 2a is struck by the advancing striking driver 3 to be driven into the workpiece W.

Figure 3:
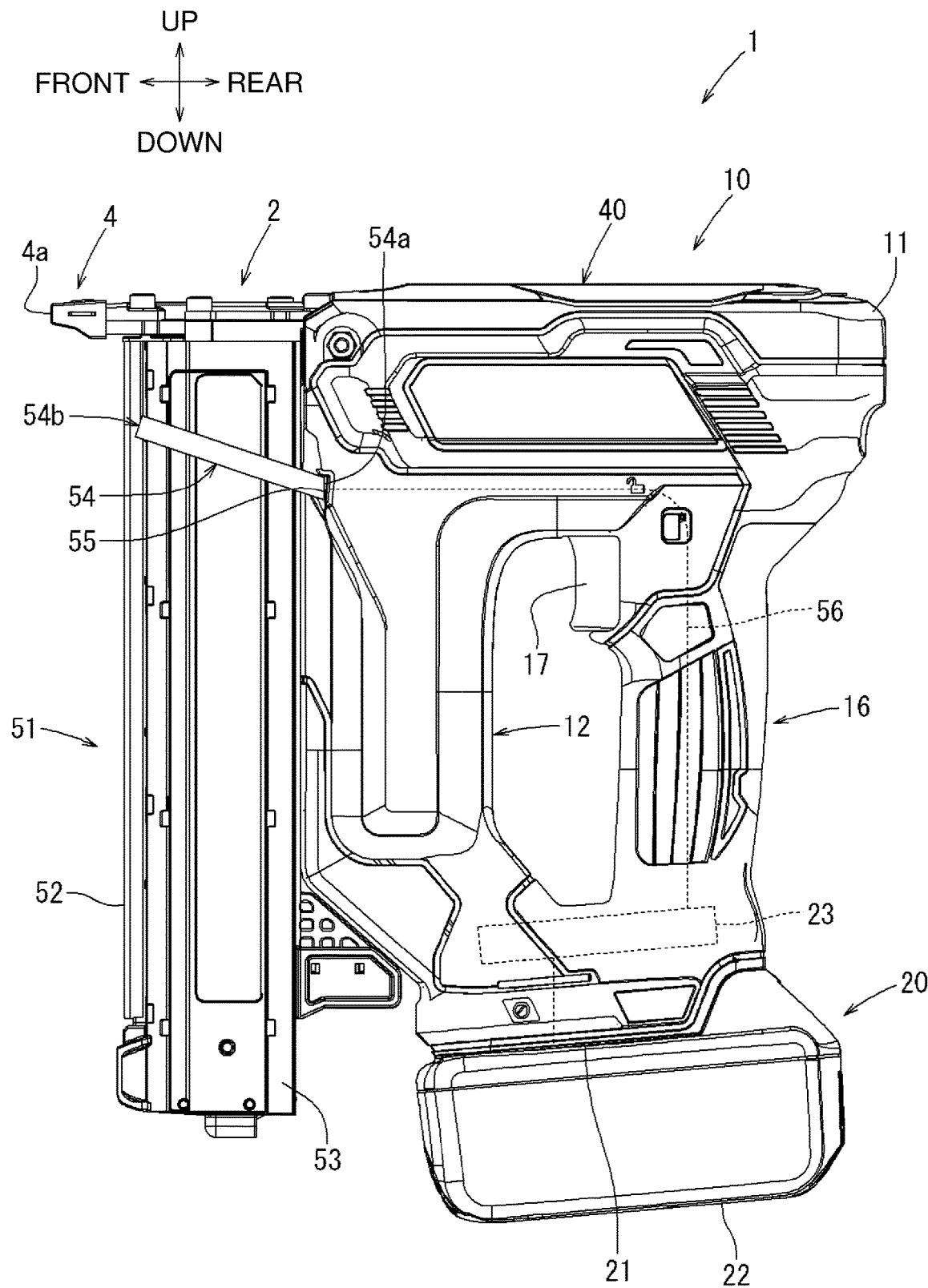
FIG. 3 is a side view of the driving tool.

As shown in FIGS. 1 and 3, the body 10 includes an illuminator 55 at the front end in a left portion. The illuminator 55 is located on the lower portion of the body 10 to which the motor compartment 12 is connected. Thus, the illuminator 55 is below the nozzle 4. The illuminator 55 includes, for example, a light-emitting diode (LED) as a light source. The LED included in the illuminator 55 is electrically connected to the battery pack 22 attached to the battery mount 21. The LED receives power from the battery pack 22 to emit light. The illuminator 55 emits light forward.

FIG. 3 schematically shows a wire 56 for supplying power from the battery pack 22 to the illuminator 55. The wire 56 electrically connects the illuminator 55 to the battery mount 21 with the controller 23 between them. For example, the wire 56 extends from the power supply portion 20 through the spaces in the grip 16 and the body housing 11. Thus, the wire 56 can be appropriately located within, for example, the body housing 11 and the grip 16 that are typically included in the driving tool 1 without any additional component.

The illuminator 55 is electrically connected to, for example, the battery pack 22, the controller 23, and the switch body 18 (refer to FIG. 5). The illuminator 55 enters a ready state in response to the user pulling the switch lever 17 and turning on the switch body 18. The illuminator 55 in the ready state is automatically turned on in response to receiving power from the battery pack 22. When the driver base 42 reaches the retraction end position with the driver returner 30, the microswitch 7 is turned on to stop the electric motor 13. When a predetermined time period elapses after the electric motor 13 stops, the controller 23 stops power supply from the battery pack 22 to the illuminator 55. The illuminator 55 is then turned off automatically.

Figure 2:
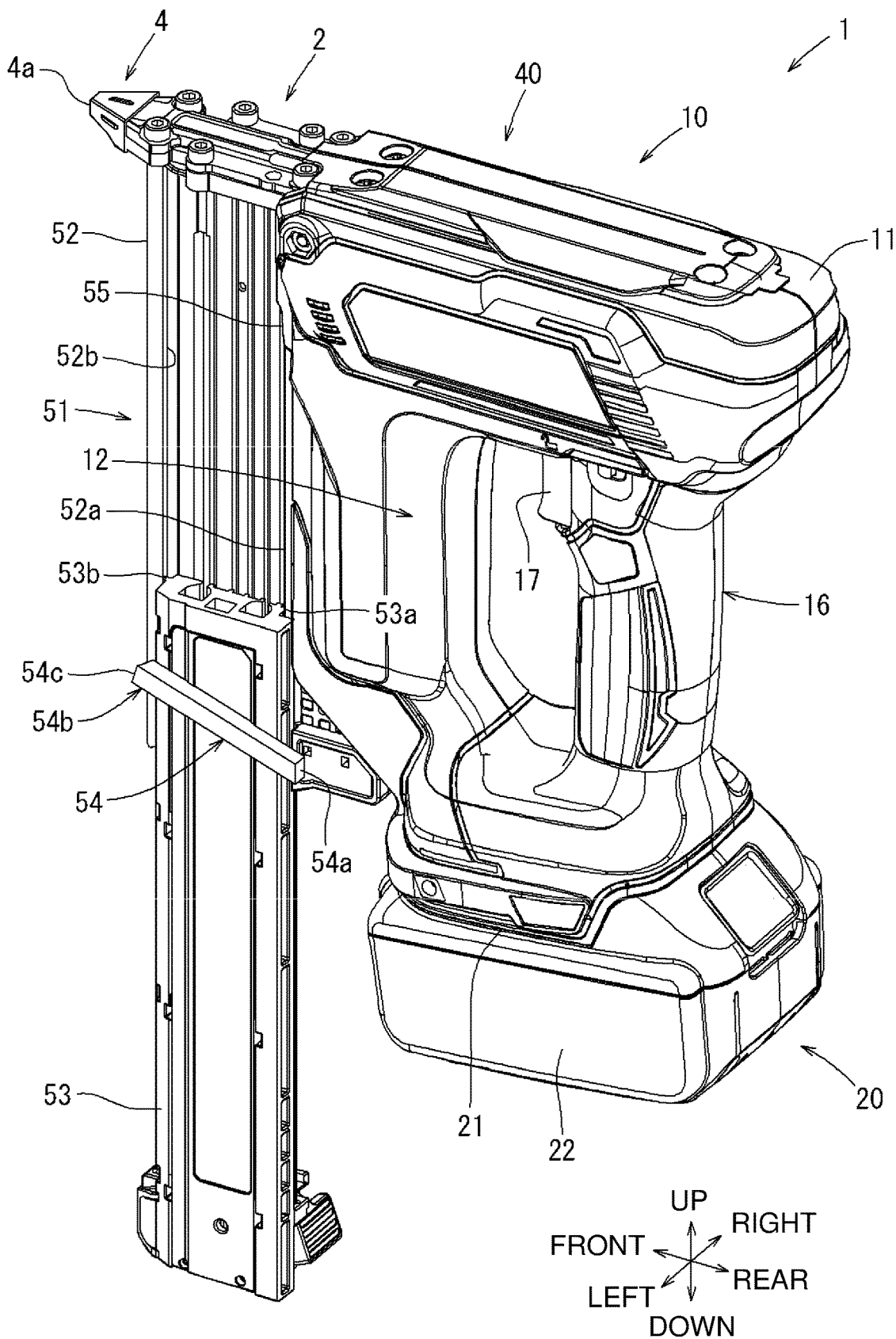
FIG. 2 is a perspective view of the driving tool with a magazine open.

As shown in FIGS. 1 and 2, the magazine 51 includes a rectangular box-shaped magazine body 52 and a door 53. The door 53 is operable to open and close an opening in the magazine body 52. The magazine body 52 is a box having the opening in the left surface. The door 53 is located on the left surface of the magazine body 52. The magazine body 52 includes a rail 52a vertically extending at the rear of the opening. The magazine body 52 has a rail groove 52b extending parallel to the rail 52a at the front of the opening. The door 53 has a rail groove 53a vertically extending at the rear. The door 53 includes a rail 53b extending parallel to the rail groove 53a at the front.

The rail 52a and the rail groove 53a are engaged to be vertically movable relative to each other. The rail 53b and the rail groove 52b are engaged to be vertically movable relative to each other. The door 53 is thus slidable vertically along the rail 52a and the rail groove 52b.

The door 53 is slid downward to open the magazine body 52, which can then receive the fasteners T (refer to FIG. 5). The door 53 is slid upward to the closed position to close the magazine body 52. The magazine body 52 is formed from an opaque resin. The door 53 is formed from a transparent resin, such as a polycarbonate or an acrylic resin. The door 53 thus serves as a window through which the fasteners T (refer to FIG. 5) in the magazine body 52 are visible from outside.

As shown in FIG. 3, a light guide 54 is located on the left surface (outer surface) of the door 53. The light guide 54 is integral with the door 53. The light guide 54 is formed from the same transparent resin as the door 53, such as a polycarbonate or an acrylic resin. The light guide 54 is a rectangular column extending in the front-rear direction along the outer surface of the door 53. The light guide 54 is slightly angled upward from the rear to the front. The light guide 54 includes a light entry portion 54a at the rear end and a light output portion 54b at the front end. The light entry portion 54a is located rearward from the rear end of the door 53. The light output portion 54b is located substantially at the same position as the front end of the door 53 in the front-rear direction. In other words, the light guide 54 is between the illuminator 55 and the nozzle 4 in the front-rear direction.

The light entry portion 54a is immediately in front of the illuminator 55 with the door 53 at the closed position. The light entry portion 54a at this position covers substantially the entire light-emitting surface of the illuminator 55. Thus, the light from the illuminator 55 mostly enters the light entry portion 54a. The light entering through the light entry portion 54a travels along the light guide 54. The light travels through the light guide 54 to the light output portion 54b at the front substantially without leaking from the light guide 54 through its side surfaces.

Figure 4:
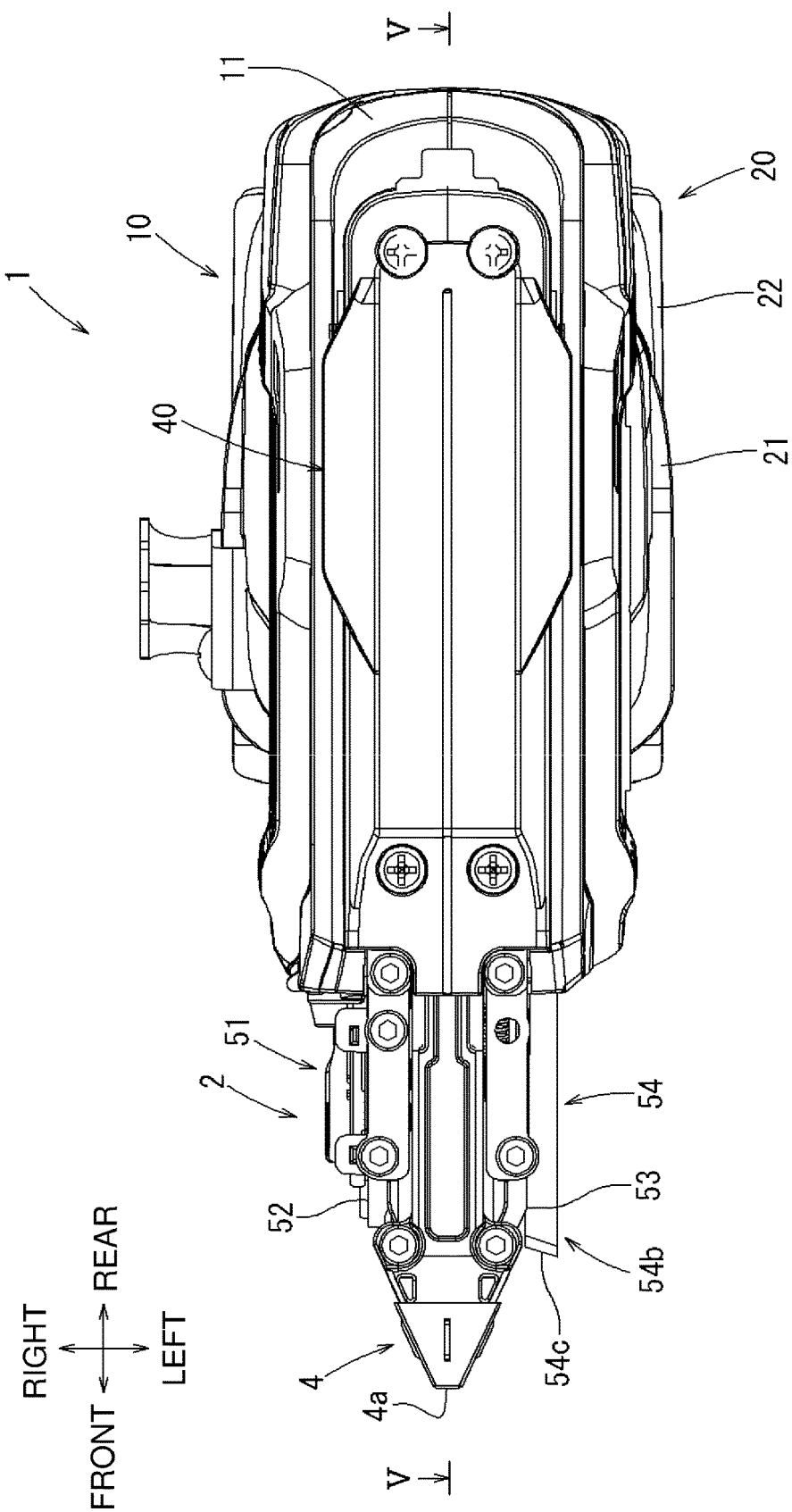
FIG. 4 is a top view of the driving tool.
Figure 6:
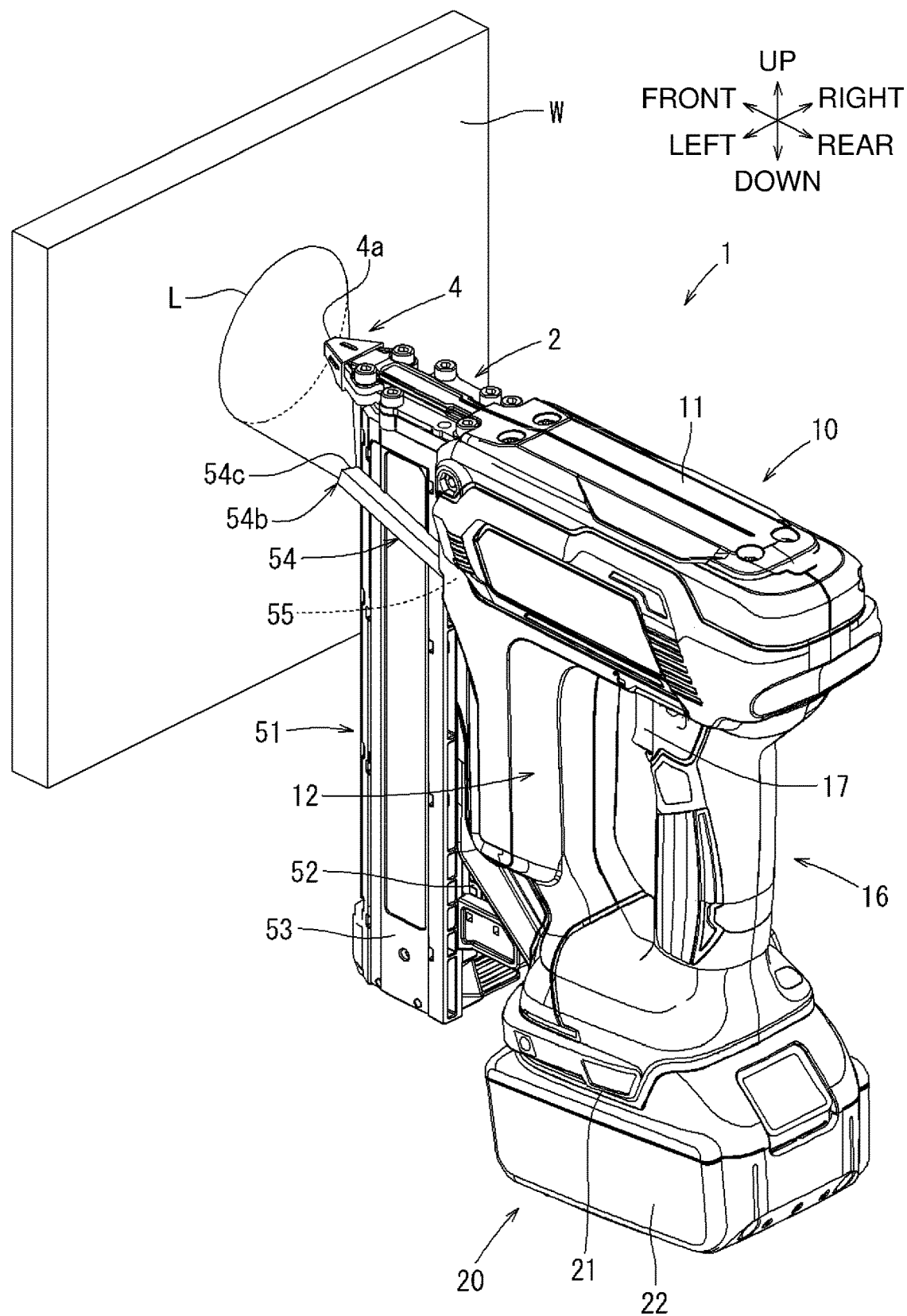
FIG. 6 is a perspective view of the driving tool as viewed from the left rear.

As shown in FIGS. 4 and 6, the light output portion 54b has an end face to be an inclined surface 54c. The inclined surface 54c is angled rightward and upward to allow the nozzle 4 to be on an imaginary line perpendicular to the inclined surface 54c. The inclined surface 54c defines a plane perpendicular to the line connecting the light output portion 54b and the nozzle 4. Thus, the light output from the light guide 54 through the inclined surface 54c is substantially aligned toward the nozzle 4.

Figure 7:
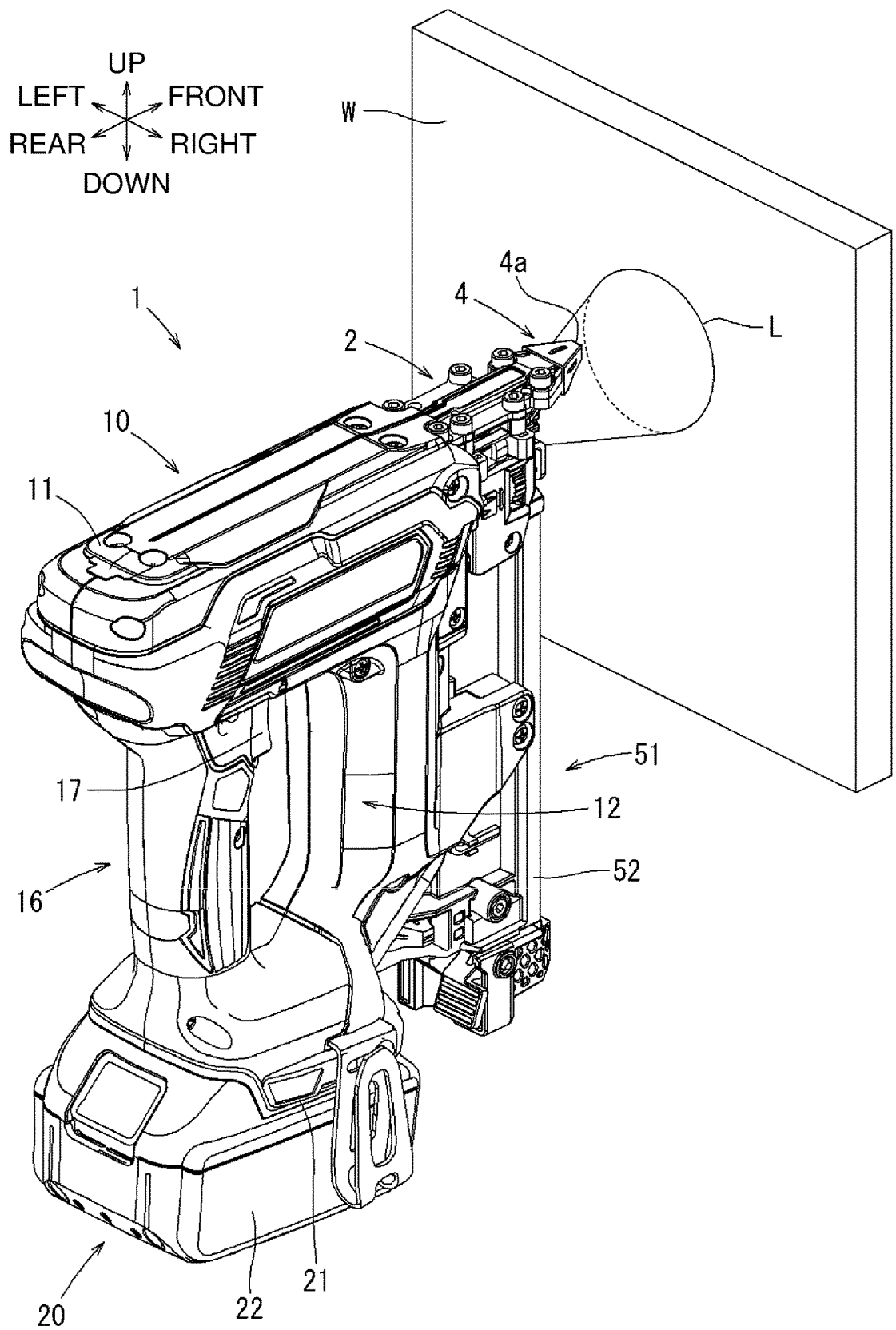
FIG. 7 is a perspective view of the driving tool as viewed from the right rear.

As shown in FIGS. 6 and 7, the light is output from the light output portion 54b near the front end of the door 53 toward the nozzle 4. Thus, the nozzle 4 can avoid being shadowed by the door 53 or the magazine body 52. In a schematic view, the illuminating light has a relatively large, substantially circular illumination area L that illuminates the nozzle 4 and an area on the workpiece W around the nozzle 4. The area around the nozzle 4 is illuminated substantially uniformly as viewed from either left or right of the driving tool 1.

Figure 10:
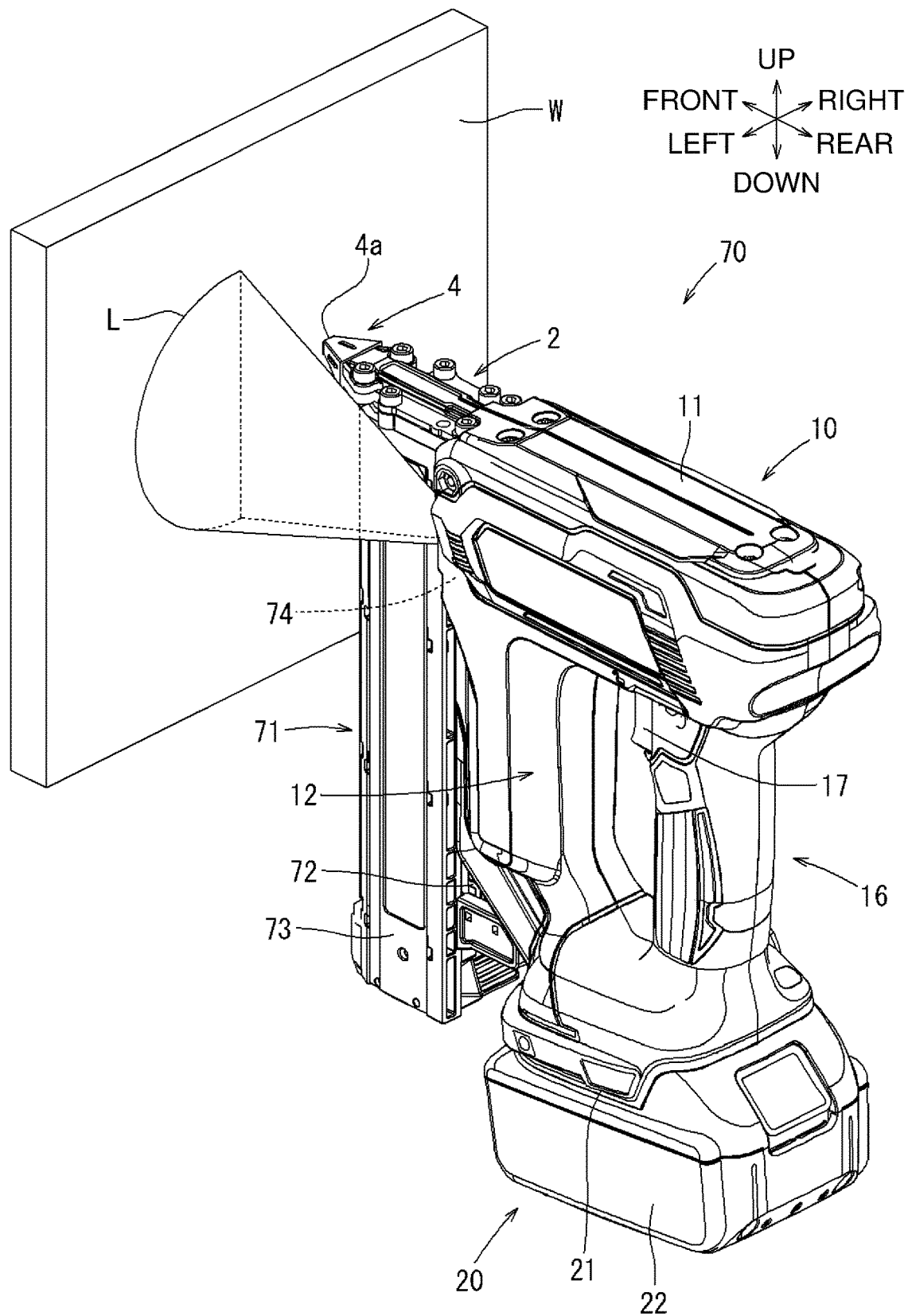
FIG. 10 is a perspective view of a driving tool in a first comparative example.

FIG. 10 shows a driving tool 70 in a first comparative example, in comparison with the driving tool 1. The driving tool 70 includes an illuminator 74 at the left front of the body 10, similarly to the illuminator 55 in the driving tool 1 (refer to FIG. 6). The driving tool 70 includes a magazine 71 including a rectangular box-shaped magazine body 72 and a door 73. The door 73 is vertically slidable on the left surface of the magazine body 72. The door 73 in the first comparative example has no light guide, unlike the door 53 in the first embodiment (refer to FIG. 6). Thus, the door 73 or the magazine body 72 blocks light from the illuminator 74 and shadows a right area. In a schematic view, the illuminator 74 has a substantially semicircular illumination area L that illuminates an area on the left of the nozzle 4. Thus, an area on the right of the nozzle 4 is less visible.

The driving tool 1 according to the present embodiment includes the striking mechanism 40 for striking the fastener T and the body 10 including the striking mechanism 40. The driving tool 1 further includes the nozzle 4 that allows ejection of the fastener T struck by the striking mechanism 40. The body 10 includes the illuminator 55. The light guide 54 is between the illuminator 55 and the nozzle 4.

This allows appropriate routing of the wire 56 in the body 10 to supply power to the illuminator 55, thus allowing easy assembly of the illuminator 55 and the wire 56 with the body 10. The light from the illuminator 55 is guided by the light guide 54 to an area around the nozzle 4. The illuminator 55 can thus illuminate a large area from the front end of the light guide 54 to the area around the nozzle 4. This structure also prevents light diffusion or reduction in the amount of light in the area between the illuminator 55 and the nozzle 4.

The driving tool 1 includes the magazine 51 for feeding the fastener T to the striking mechanism 40. The illuminator 55 is located at the front of the body 10 in the driving direction. The light guide 54 is on the magazine 51. Thus, the light guide 54 connects the light source in the illuminator 55 to the nozzle 4 with the shortest or substantially the shortest distance between them. This minimizes the loss of light reaching the nozzle 4.

The magazine 51 is a box extending in the driving direction and in a direction perpendicular to the driving direction. The magazine 51 includes the magazine body 52 for accommodating the fastener T and the door 53 operable to open and close the magazine body 52. The light guide 54 is on the door 53. For example, the user holds the driving tool 1 with the right hand and looks at a driving target place for the fastener T from the left to the right of the driving tool 1. The driving tool 1, which is expected to be held with the right hand, has the door 53 on the left surface of the magazine body 52. The light through the light guide 54 is output to illuminate an area around the nozzle 4 from left to right. Thus, the user's gaze direction substantially aligns with the illumination direction, allowing good visibility of the driving target place for the fastener T on the workpiece W.

The light guide 54 extends along the periphery of the magazine 51 for feeding the fastener T to the striking mechanism 40. The light guide 54 thus has its longitudinal surface located on the periphery of the magazine 51. This allows the light guide 54 to be stably supported on the magazine 51 and guide light from the illuminator 55 in a more stable direction.

The light guide 54 is integral with the door 53 on the magazine 51. This structure includes fewer components and involves fewer assembly processes. The structure also eliminates any attachment components around the light guide 54, and reduces the dimensions around the light guide 54.

The light guide 54 includes the light output portion 54b at the front end in the illumination direction. The light output portion 54b includes the inclined surface 54c angled to allow the nozzle 4 to be on an imaginary line perpendicular to the inclined surface 54c. This allows light from the light output portion 54b to travel in the direction perpendicular to the inclined surface 54c. The area around the nozzle 4 is thus illuminated with concentrated light with high illumination efficiency.

The driving tool 1 also includes the battery mount 21 to which the battery pack 22 as a power supply for the striking mechanism 40 is attachable in a detachable manner. The illuminator 55 receives power from the battery pack 22 through the wire 56. Thus, the illuminator 55 is powered by the battery pack 22 for operating the striking mechanism 40, rather than by an additional power supply.

The illuminator 55 automatically switches on and off in response to driving of the striking mechanism 40. The illuminator 55 is automatically turned on in response to, for example, the user pulling the switch lever 17 before the fastener T is driven. The illuminator 55 is turned off after the fastener T is driven. The user can use the driving tool 1 without switching on and off the illuminator 55, thus allowing good workability of the driving tool 1.

A driving tool 60 according to a second embodiment of the present disclosure will now be described with reference to FIGS. 8 and 9. The driving tool 60 according to the present embodiment includes a magazine 61 and an illuminator 65, instead of the magazine 51 and the illuminator 55 in the driving tool 1 according to the first embodiment. The magazine 61 includes a light guide 64 on the right surface. The illuminator 65 is located at the front end of the body 10 in its right lower portion. The illuminator 65 is electrically connected to the battery pack 22 attached to the battery mount 21. The illuminator 65 includes, for example, an LED as a light source for emitting light forward. The light guide 64 and the illuminator 65 are substantially symmetrical to the light guide 54 and the illuminator 55 shown in FIG. 6 in the lateral direction.

Figure 8:
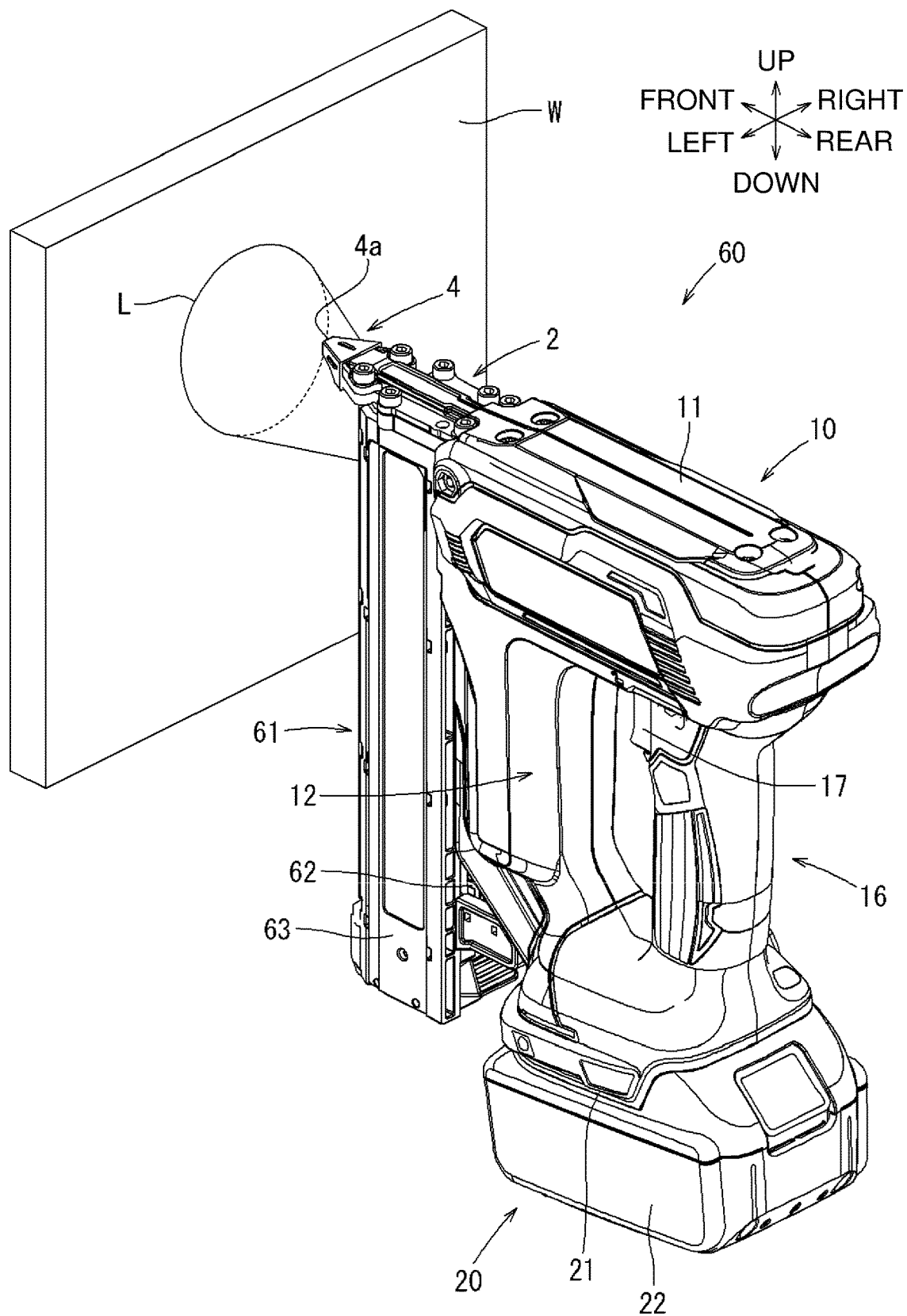
FIG. 8 is a perspective view of a driving tool according to a second embodiment as viewed from the left rear.

As shown in FIG. 8, the magazine 61 includes a magazine body 62 and a door 63. The magazine body 62 is a rectangular box having an opening in the left surface. The door 63 is vertically operable and thus is open and closed on the left surface of the magazine body 62. The magazine body 62 is formed from an opaque resin. The door 63 may be formed from a transparent resin or from an opaque resin similarly to the magazine body 62.

Figure 9:
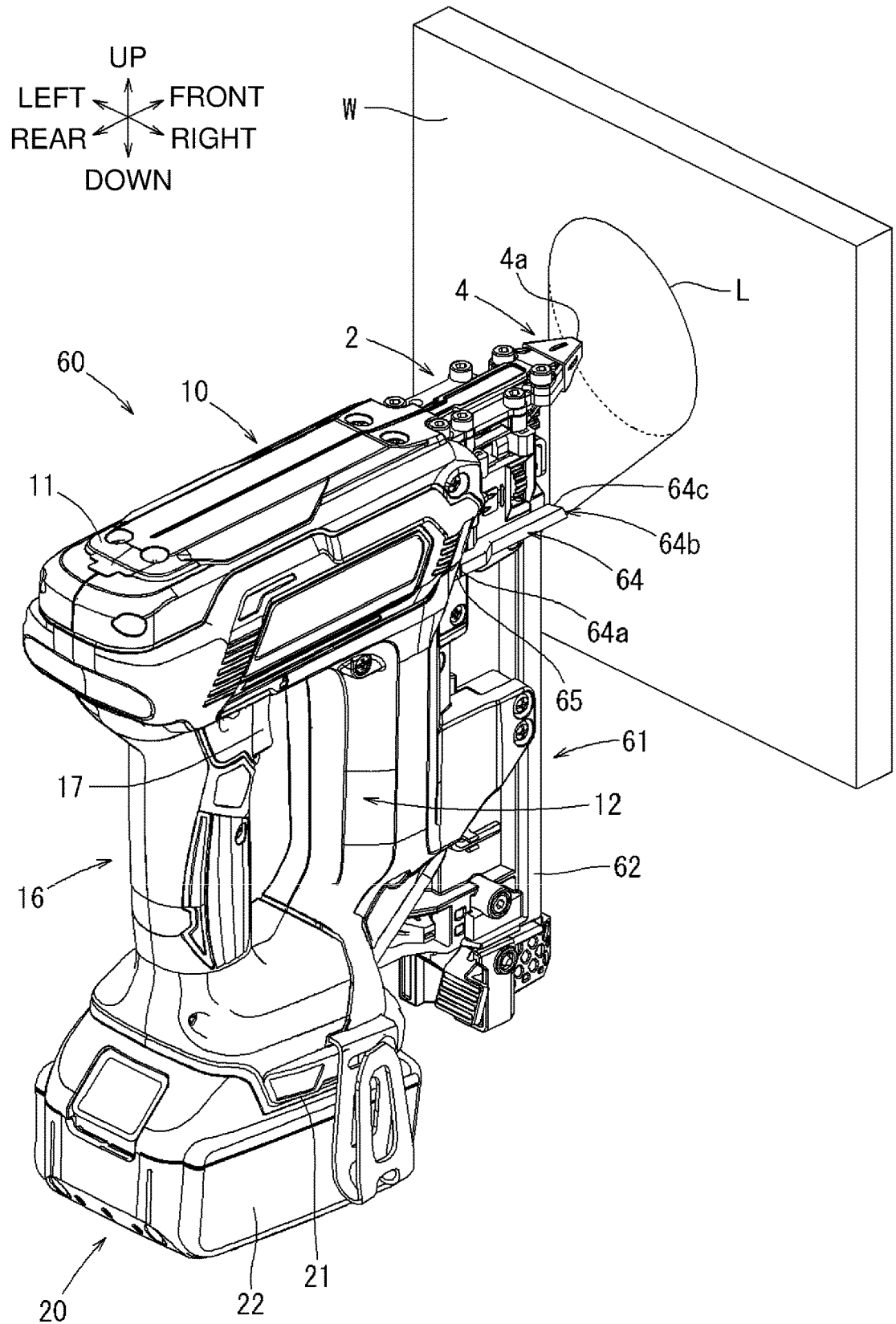
FIG. 9 is a perspective view of the driving tool according to the second embodiment as viewed from the right rear.

As shown in FIG. 9, the light guide 64 is a rectangular column extending in the front-rear direction along the right surface of the magazine body 62. The light guide 64 is formed from a transparent resin, such as a polycarbonate or an acrylic resin. In other words, the light guide 64 is formed from a resin different from the resin of the magazine body 62. The light guide 64 is fixed to the right surface of the magazine body 62 with, for example, an adhesive. The light guide 64 includes a light entry portion 64a at the rear end and a light output portion 64b at the front end. The light entry portion 64a in the light guide 64 is located rearward from the rear end of the magazine body 62. The light output portion 64b is located substantially at the same position as the front end of the magazine body 62 in the front-rear direction. In other words, the light guide 64 is between the illuminator 65 and the nozzle 4 in the front-rear direction.

As shown in FIG. 9, the light entry portion 64a is immediately in front of the illuminator 65. The light from the illuminator 65 mostly enters the light entry portion 64a. The light entering through the light entry portion 64a travels along the light guide 64 to the light output portion 64b at the front substantially without leaking from the light guide 64 through its side surfaces. The light output portion 64b has an end face to be an inclined surface 64c. The inclined surface 64c is substantially flat and angled leftward and upward to allow the nozzle 4 to be on an imaginary line perpendicular to the inclined surface 64c. Thus, the light output from the light guide 64 through the inclined surface 64c is substantially aligned toward the nozzle 4.

As shown in FIGS. 8 and 9, the light is output from the light output portion 64b near the front end of the magazine body 62 toward the nozzle 4. Thus, the nozzle 4 can avoid being shadowed by the magazine body 62. In a schematic view, the illuminating light has a relatively large, substantially circular illumination area L that illuminates the nozzle 4 and an area on the workpiece W around the nozzle 4. The area around the nozzle 4 is illuminated substantially uniformly as viewed from either left or right of the driving tool 1.

Figure 11:
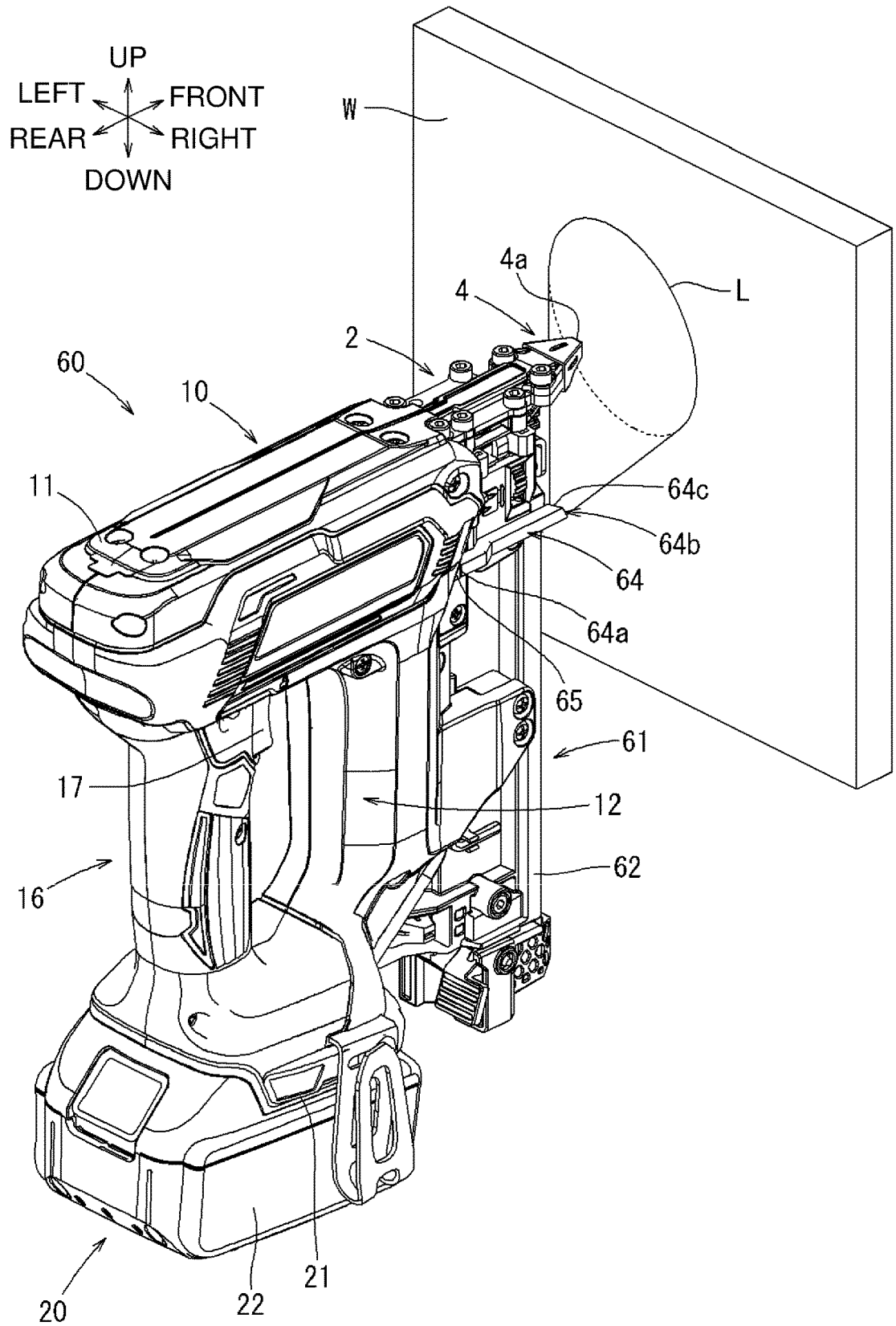
FIG. 11 is a perspective view of a driving tool in a second comparative example.

FIG. 11 shows a driving tool 80 in a second comparative example, in comparison with the driving tool 60. The driving tool 80 includes an illuminator 84 at the right front of the body 10, similarly to the illuminator 65 in the driving tool 60 (refer to FIG. 9). The driving tool 80 includes a magazine 81 including a rectangular box-shaped magazine body 82. The magazine body 82 in the second comparative example has no light guide on the lateral surface, unlike the magazine body 62 in the second embodiment (refer to FIG. 9). Thus, the magazine body 82 blocks light from the illuminator 84 and shadows a left area. In a schematic view, the illuminator 84 has a substantially semicircular illumination area L that illuminates an area on the right of the nozzle 4. Thus, an area on the left of the nozzle 4 is less visible.

The magazine 61 in the present embodiment is a box extending in the driving direction and in a direction perpendicular to the driving direction. The magazine 61 includes the magazine body 62 for accommodating the fastener T and the door 63 operable to open and close the magazine body 62. The light guide 64 is located on the magazine body 62 fixed to the body 10. This allows the light guide 64 to be stably positioned relative to the body 10 and guide light from the front end of the light guide 64 in a more stable direction.

The driving tools 1 and 60 according to the above embodiments may be modified variously. The driving tools 1 and 60 according to the above embodiments include the striking mechanism 40 including a mechanical spring. In some embodiments, the driving tool may use a gas spring to produce a driving force from the pressure of gas enclosed in an accumulator. In some embodiments, the driving tool may be a flywheel driving tool that uses the inertial force of a flywheel to project a driver, or an electro-pneumatic driving tool that uses compressed air generated by rotating a crank with an electric motor.

The driver returner 30 in the above embodiments includes the single idler gear 31 and the single return gear 32. In some embodiments, the driver returner 30 may include multiple idler gears 31 or may exclude the idler gear 31. In some embodiments, the driver returner 30 may include multiple return gears each having a protruding engagement portion.

The light guides 54 and 64 in the above embodiments are rectangular columns. In some embodiments, the light guides 54 and 64 may be circular columns or polygonal columns other than rectangular columns. The light guides 54 and 64 in the above embodiments are formed from a transparent resin. In some embodiments, the light guides 54 and 64 may be, for example, glass columns. For example, the light guides 54 and 64 may be formed from, for example, glass fiber. The doors 53 and 63 in the above embodiments are formed from a transparent resin, but may be formed from an opaque resin. The light guides 54 and 64 in the above embodiments have the flat inclined surfaces 54c and 64c at the front end. In some embodiments, the inclined surfaces 54c and 64c may be, for example, convex or concave. Such surfaces can adjust the convergence or divergence of light for illuminating the nozzle 4.

The wire 56 in the above embodiments extends from the power supply portion 20 through the spaces in the grip 16 and the body housing 11. In some embodiments, the wire 56 may extend from the power supply portion 20 through the spaces in the motor compartment 12 and the body housing 11. The illuminator 55 in the above embodiments uses an LED. In some embodiments, the illuminator 55 may use, for example, an incandescent lamp that receives power from the battery pack 22 to emit light.

The structure in the above embodiments may also be modified as appropriate in, for example, the initial position of the driver base in the initial state of the driving operation, or in the timing of stopping the electric motor. The on-off timings of the illuminators 55 and 65 in the above embodiments may also be modified as appropriate. For example, the illuminators 55 and 65 may be turned off a predetermined time period after the switch body 18 is turned on. The driving tools 1 and 60 in the above embodiments use the battery pack 22 as a direct-current (DC) power supply. In some embodiments, the driving tool may use, for example, a utility alternating-current (AC) power supply with 100 V.

REFERENCE SIGNS LIST

T fastener
W workpiece
L illumination area
1 driving tool (rechargeable pin nailer)
2 driving nose
2a driving path
3 striking driver
3a engagement pin
4 nozzle
4a port
5 actuation arm
6 microswitch (for detecting actuation of contact arm)
7 microswitch (for detecting retraction end position of driver base)
10 body
11 body housing
12 motor compartment
13 electric motor
13a motor axis
14 planetary gear train
15 output gear
16 grip
17 switch lever
18 switch body
20 power supply portion
21 battery mount
22 battery pack
23 controller
30 driver returner
31 idler gear
31a axis
32 return gear (drive gear)
32a axis
33 first engagement portion
34 second engagement portion
35 first engagement receiver
36 second engagement receiver
40 striking mechanism
41 support shaft
42 driver base
43 striking spring
44 holding sleeve
45 leading end damper
51 magazine
52 magazine body
52a rail
52b rail groove
53 door
53a rail groove
53b rail
54 light guide
54a light entry portion
54b light output portion
54c inclined surface
55 illuminator (LED)
56 wire
60 driving tool
61 magazine
62 magazine body
63 door
64 light guide
64a light entry portion
64b light output portion
64c inclined surface
65 illuminator (LED)
70 driving tool
71 magazine
72 magazine body
73 door
74 illuminator (LED)
80 driving tool
81 magazine
82 magazine body
84 illuminator (LED)

What is claimed is:

1. A driving tool, comprising:
   a striking mechanism configured to strike a fastener;
   a body including the striking mechanism and an illuminator;
   a nozzle to allow ejection of the fastener struck by the striking mechanism;
   a light guide between the illuminator and the nozzle; and
   a magazine configured to feed the fastener to the striking mechanism, wherein:
   the illuminator is at a front of the body in a driving direction; and
   the light guide is on the magazine.

2. The driving tool according to claim 1, wherein
   the magazine is a box extending in the driving direction and in a direction perpendicular to the driving direction, and the magazine includes a magazine body configured to accommodate the fastener, and a door operable to open and close the magazine body, and
   the light guide is on the door.

3. The driving tool according to claim 2, wherein
   the light guide extends along a periphery of the magazine.

4. The driving tool according to claim 3, wherein
   the light guide is at least partially integral with the magazine.

5. The driving tool according to claim 3, wherein
   the light guide includes a light output portion at a front end of the light guide in an illumination direction, and the light output portion includes an inclined surface angled to allow the nozzle to be on an imaginary line perpendicular to the inclined surface.

6. The driving tool according to claim 2, wherein the light guide is at least partially integral with the magazine.

7. The driving tool according to claim 6, wherein the light guide includes a light output portion at a front end of the light guide in an illumination direction, and the light output portion includes an inclined surface angled to allow the nozzle to be on an imaginary line perpendicular to the inclined surface.

8. The driving tool according to claim 2, wherein the light guide includes a light output portion at a front end of the light guide in an illumination direction, and the light output portion includes an inclined surface angled to allow the nozzle to be on an imaginary line perpendicular to the inclined surface.

9. The driving tool according to claim 2, further comprising:
a battery mount to which a battery pack as a power supply for the striking mechanism is attachable in a detachable manner,
wherein the illuminator receives power from the battery.

10. The driving tool according to claim 1, wherein the magazine is a box extending in the driving direction and in a direction perpendicular to the driving direction, and the magazine includes a magazine body configured to accommodate the fastener, and a door operable to open and close the magazine body, and the light guide is on the magazine body.

11. The driving tool according to claim 10, wherein the light guide extends along a periphery of the magazine.

12. The driving tool according to claim 10, wherein the light guide is at least partially integral with the magazine.

13. The driving tool according to claim 10, wherein the light guide includes a light output portion at a front end of the light guide in an illumination direction, and the light output portion includes an inclined surface angled to allow the nozzle to be on an imaginary line perpendicular to the inclined surface.

14. The driving tool according to claim 10, further comprising:
a battery mount to which a battery pack as a power supply for the striking mechanism is attachable in a detachable manner,
wherein the illuminator receives power from the battery.

15. The driving tool according to claim 1, wherein the light guide includes a light output portion at a front end of the light guide in an illumination direction, and the light output portion includes an inclined surface angled to allow the nozzle to be on an imaginary line perpendicular to the inclined surface.

16. The driving tool according to claim 1, further comprising:
a battery mount to which a battery pack as a power supply for the striking mechanism is attachable in a detachable manner,
wherein the illuminator receives power from the battery.

17. The driving tool according to claim 1, wherein the illuminator automatically switches on and off in response to driving of the striking mechanism.

* * * * *